US011474186B2

United States Patent
Keal

(10) Patent No.: US 11,474,186 B2
(45) Date of Patent: Oct. 18, 2022

(54) BUILDING MANAGEMENT SYSTEM FOR SENSOR TIME CORRECTION

(71) Applicant: Building Robotics, Inc., Oakland, CA (US)

(72) Inventor: William Kerry Keal, San Jose, CA (US)

(73) Assignee: Building Robotics, Inc., Oakland, CA (US)

( * ) Notice: Subject to any disclaimer, the term of this patent is extended or adjusted under 35 U.S.C. 154(b) by 710 days.

(21) Appl. No.: 16/534,525

(22) Filed: Aug. 7, 2019

(65) Prior Publication Data
US 2021/0041520 A1    Feb. 11, 2021

(51) Int. Cl.
*G01S 3/02* (2006.01)
*G01S 5/00* (2006.01)
(Continued)

(52) U.S. Cl.
CPC ............ *G01S 5/0054* (2013.01); *G01S 5/145* (2013.01); *G05B 19/402* (2013.01); *G06F 17/15* (2013.01); *G06V 20/64* (2022.01)

(58) Field of Classification Search
CPC ..... G01S 5/0054; G01S 5/145; G05B 19/402; G05B 2219/2642; G05B 15/02; G06F 17/15; G06F 1/12; G06V 20/64; Y02B 20/40; H04Q 9/04; H04W 56/003; H05B 47/115; H04J 3/0638
(Continued)

(56) References Cited

U.S. PATENT DOCUMENTS 9,080,883 B2    7/2015    Frey
9,585,227 B2    2/2017    Mohan et al.
(Continued)

FOREIGN PATENT DOCUMENTS

CA    2893895 A1 *    6/2014    ......... F04D 15/0209
CN    103168278 A *    6/2013    ............. G01R 19/00
(Continued)

OTHER PUBLICATIONS

Shrivastava N et al: "Target Tracking with Binary Proximity Sensors: Fundamental Limits, Minimal Descriptions, and Algorithms", SENSYS'06 : Proceedings of the Fourth International Conference on Embedded Networked Sensor Systems, Oct. 31-Nov. 3, 2006, Boulder, CO, Association for Computing Machinery, New York, NY XP058318531, 14 pages.
(Continued)

*Primary Examiner* — Mahendra R Patel

(57) ABSTRACT

A building management system and method for sensor time correction is described. The system comprises multiple sensors and an energy manager communicating with the sensors. The sensors, distributed within a particular area, provide multiple time measurements in response to detecting an object traversing among the sensors in which the time measurements are associated with unsynchronized time. The energy manager identifies a predicted time for traversing among the sensors based on one or more distances between pairs of sensors and an average velocity of the object to traverse among the sensors. The energy manager determines a sensor time error for each sensor by cross-correlating the time measurements with the predicted time.

12 Claims, 6 Drawing Sheets

(51) Int. Cl.
 *G01S 5/14* (2006.01)
 *G05B 19/402* (2006.01)
 *G06F 17/15* (2006.01)
 *G06V 20/64* (2022.01)
(58) Field of Classification Search
 USPC .......................................................... 342/464
 See application file for complete search history.

(56) References Cited

U.S. PATENT DOCUMENTS

| | | | |
|---|---|---|---|
| 9,872,271 B2 | 1/2018 | Ericsson et al. | |
| 10,088,818 B1* | 10/2018 | Mathews | G05B 15/02 |
| 10,117,308 B2* | 10/2018 | Patel | H05B 47/115 |
| 10,182,487 B2* | 1/2019 | Mohan | H05B 47/125 |
| 2012/0153868 A1* | 6/2012 | Gu | H05B 47/115 |
| | | | 315/307 |
| 2012/0176159 A1* | 7/2012 | Webb, III | G04F 10/00 |
| | | | 327/18 |
| 2018/0252423 A1* | 9/2018 | Hieke | F24F 11/30 |
| 2018/0308029 A1 | 10/2018 | Loffler et al. | |
| 2018/0328737 A1 | 11/2018 | Frey et al. | |
| 2019/0007809 A1 | 1/2019 | Frey et al. | |
| 2019/0020494 A1* | 1/2019 | Roosli | H04L 41/12 |
| 2019/0104383 A1 | 4/2019 | Keal | |

FOREIGN PATENT DOCUMENTS

| | | |
|---|---|---|
| WO | 2017108408 | 6/2017 |
| WO | WO-2017108408 A1 * | 6/2017 |

OTHER PUBLICATIONS

PCT Search Report dated Oct. 21, 2020, for PCT Application No. PCT/US2020/042226, 17 pages.

* cited by examiner

BUILDING MANAGEMENT SYSTEM FOR SENSOR TIME CORRECTION

FIELD OF THE INVENTION

Aspects of the present invention generally relate to sensors of building management systems and, more particularly, systems and methods for time correction of motion sensors for building management systems.

BACKGROUND

Building management systems provide the capability of managing many building management components from a central front-end interface or group of interfaces. These building management components include building equipment for lighting, power, heating, ventilation, air conditioning, fire safety, and security. The building management systems offer operational and sustainability benefits for building developers, managers, and occupants.

Advanced building management systems may determine the quantity and location of people located in a building or a particular area of the building. For example, a lighting system of the building management system may include motion sensors positioned near ceiling light fixtures to detect proximal motion. The sensors of the lighting system may deliver timing data corresponding to the detected motion to a central server. The central server will need precise timing data in order to track people accurately.

Some motion sensors of lighting systems do not provide precise timing data. Each motion sensor may include an on-board clock but the clock of one motion sensor may be misaligned in time relative to another motion sensor of the lighting system. Existing lighting systems may address the misalignment in time of motion sensors, but they do so at the expense of added cost and/or insufficient precision. For example, the time of an on-board clock for a particular sensor may be set periodically through a broadcast message provided to the sensor or an external tool but additional components and complexity are added to the lighting system. For another example, the central server may store the time when timing data is received as well as the sensor time, but errors in transmit timing may still exist. Thus, existing lighting systems do not adequately address the problem of insufficient precision of timing data received from motions sensors.

SUMMARY

A building management system requires accurate timing data in order to determine occupancy within a room or an area within its managed facility. Unfortunately, the time clocks of one or more of its sensors may not be accurate, thus making the determination of occupancy difficult. Thus, the building management system may perform time correlation of the raw data received for its sensors and make the appropriate time adjustments. In this manner, the building management system may adjust the sensor timing data to compensate for the sensor time errors so that all sensor data are based on the same time base before determining occupancy of its managed facility.

One aspect is a building management system for sensor time correction comprising multiple sensors, such as motion sensors, and an energy manager communicating directly or indirectly with the sensors. The sensors are distributed within a particular area in which each pair of the sensors has a distance between the pair of sensors. The sensors provide multiple time measurements in response to detecting an object traversing among the sensors in which the time measurements are associated with unsynchronized time. The energy manager identifies a predicted time for traversing among the sensors based on one or more distances between pairs of sensors and an average velocity of the object to traverse among the sensors. The energy manager determines a sensor time error for each sensor of the sensors by cross-correlating the time measurements with the predicted time.

Another aspect is a method of a building management system for sensor time correction. A predicted time for traversing among multiple sensors is identified based on one or more distances between pairs of sensors and an average velocity of an object to traverse among the sensors. The time measurements are received from the sensors in response to detecting the object traversing among the sensors in which the time measurements are associated with unsynchronized time. A sensor time error is determined for each sensor of the sensors by cross-correlating the time measurements with the predicted time.

Yet another aspect is another method a building management system for sensor time correction. A predicted time for traversing between a first sensor and a second sensors is identified based on a distance between the first and second sensors and an average velocity of an object to traverse between the first and second sensors. A first time measurement is received from the first sensor and a second time measurement is received from the second sensor in response to the object traversing between the first and second sensors. The first and second time measurements are associated with a common time period but unsynchronized time. A non-corrected time for traversing between the first sensor and the second sensor is determined based on the first and second time measurements. A sensor time error is determined based on a cross-correlation of the predicted time and the non-corrected time.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

To facilitate an understanding of embodiments, principles, and features of the present invention, they are explained hereinafter with reference to implementation in illustrative embodiments. In particular, they are described in the context of a building management system for sensor time correction. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

A building management system may determine occupancy, such as the number of people in a room or an area, within its managed facility. The building management system utilizes precise timing data for each of its sensors in order to determine occupancy accurately throughout the managed facility. The building management system performs sensor time correction for the sensors located within its building environment or environments to address any, and preferably all, sensor time errors. The system may detect and correct errors for sensor timing data, whether the timing data is generated in real time or historically.

A sensor of the building management system senses an increase in signal level when an object, such as a person, traverses in proximity to the sensor. For some embodiments, the building management may save this sensor timing data to generate historical data. Thus, when an object traverses a set of sensors, the building management system may receive or collect the sensor timing data from the set of sensors and identify a trail corresponding to movement of the object based on the real time or historical data. When the timing of one or more of the sensors is misaligned relative to the timing of other sensors, then the misaligned time causes the corresponding sensor or sensors to operate out-of-sync and/or out-of-order. By observing the time correlation of the sensors and making the appropriate time adjustments, the building management system may determine the proper timing and order of operation of the sensors based on the non-corrected sensor timing data. For some embodiments, the building management system may determine the sensor time error based on historical data, after the sensors have detected sensor timing data for a period of time, and update the sensor time error whenever a new set of non-corrected sensor timing data is received. The building management system may identify the time error for each sensor, determine a time base from the time error, and set all sensors to the determined time base so that all sensors are on the same time base.

Figure 1:
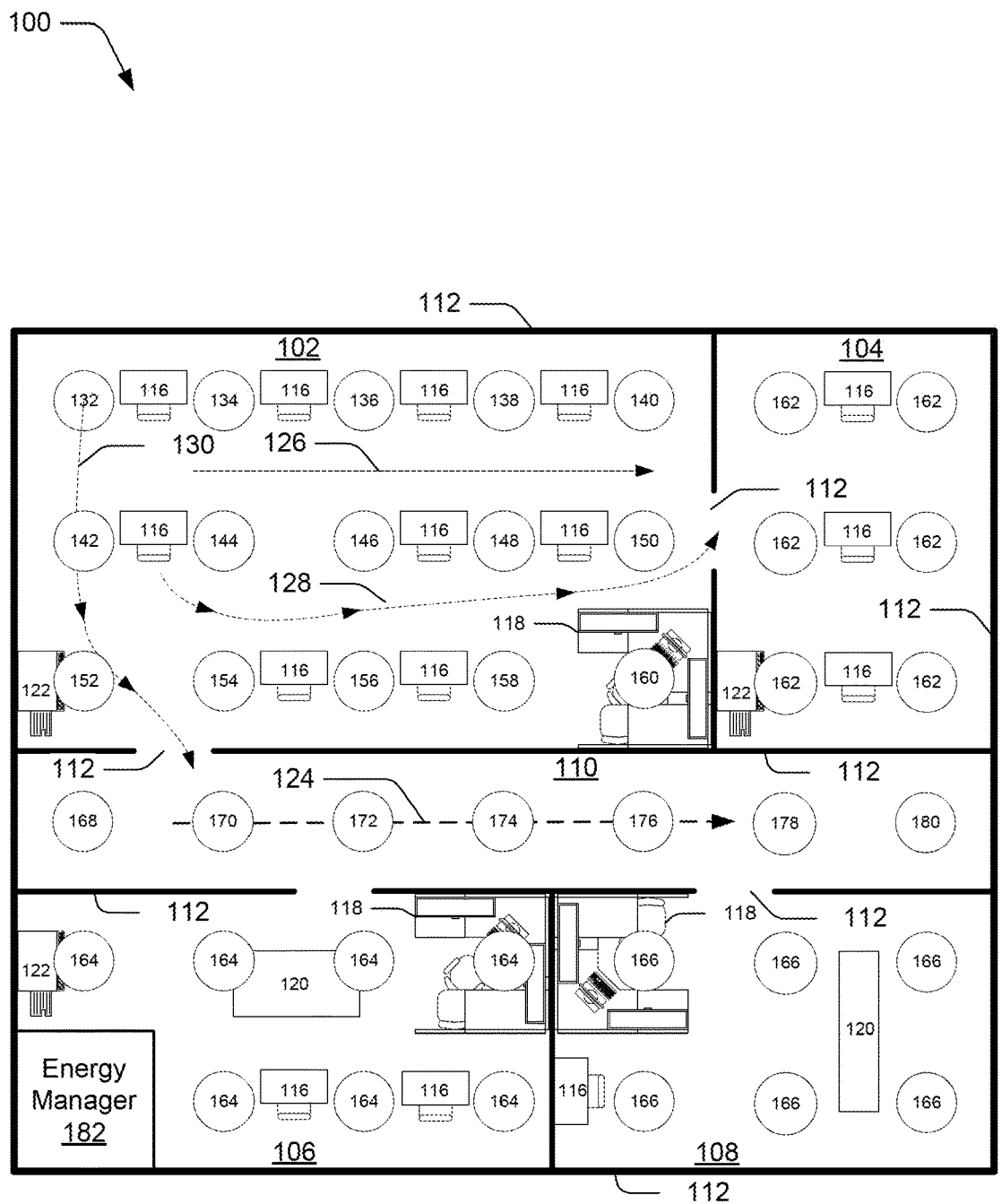
FIG. 1 is a diagrammatic, planar view of an example floor plan in which various pathways of a person may be detected by sensors of the building management system.

Referring to FIG. 1, there is illustrated an example floor plan of a facility managed by a building management system 100. The floor plan includes various areas 102-110, such as rooms 102-108 and a path 110. The areas 102-110 may be bounded or defined by fixed or substantially fixed structures 112. Examples of structures 112 include, but are not limited to, walls, portals, partial walls (such as partitions and overhead partitions), ropes, floor markings, non-physical partitions (such as areas), and the like. The floor plan also includes various non-fixed items 116-122 that may obstruct, bound, or otherwise define pathways 124-130 through the areas 102-110 of the facility. Objects, such as people, are more likely to traverse open or substantially unobstructed areas of the areas 102-110 so the pathways 124-130 of the objects will tend to avoid the structures and non-fixed items 116-122, particularly when averaged based on data gathered for multiple objects or a period of time. Examples of the items include, but are not limited to, workstations 116, cubicles 118, tables 120, movable partitions, shelving, storage units, appliances 122 such as multifunction machines, copiers, printers, shredders, networking equipment, and the like. Objects are induced or guided by one or more obstructions, e.g. the structures 112 and/or items 116-112, to create or follow pathways, such as pathways 124-130, through the areas 102-110. The obstructions may be located one side or both sides of the pathways, thus being sufficient to induce or guide the objects.

In accordance with the floor plan, the building management system 100 comprises multiple sensors 132-180 in which the various pathways 124-130 of an object, such as a person, may be detected by one or more of the sensors. For the embodiment shown in FIG. 1, some sensors 132-160 are positioned in a first room 102, some sensors 162 are positioned in a second room 104, and other sensors 164, 166 are positioned in other rooms 106, 108. The building management system 100 may also, or in the alternative, include sensors 168-180 positioned in an area that is not commonly designate as a room, such as a path 110. For the embodiment shown in FIG. 1, the sensors 132-180 are positioned in a uniform, equally spaced manner, but it is to be understood that the positioning of the sensors may vary from embodiment-to-embodiment. The position of the sensors may depend on various factors which include the proximity of the sensors to possible or probable travel paths of objects for each area 102-110. For some embodiments, one or more of the sensors 132-180 may include a motion sensor such as a passive infrared motion detection sensor.

In addition to the sensors 132-180, the building management system 100 may further include an energy manager 182 that communicates directly or indirectly with the sensors. The energy manager 182 may be co-located with the sensors 132-180, located remote from the sensors and within the same facility as the sensors, or located remote from the sensors and the facility. Also, the building management system 100 may include one or more intervening devices to communicating between the energy manager 182 and the sensors 132-180. For example, one or more gateways may be co-located with a group of sensors and facilitate communication and/or control between the energy manager 182 and the group of sensors.

The building management system 100 performs sensor time correction based on object movement, such as those represented by the pathways 124-130. For example, each pathway shown in FIG. 1 may be based on data received or collected over a particular time period for people walking through similar portions of the path 110 and/or the area 102. Similar portions may be identified by similar patterns detected by adjacent or proximal sensors. For some embodiments, an object may traverse in a linear manner aligned with one or more sensors such as the pathway 124 representing a linear pathway detected by sensors 170, 172, 174, 176. The sensors 170, 172, 174, 176 are positioned in proximity to the pathway 124 having a boundary or obstruction on one or more sides of the pathway, such as structures 112. For some other embodiments, an object may travel in a linear manner offset from the position of one or more sensors such as the pathway 126 representing a linear pathway offset from sensors 134, 136, 138, 140 and/or 144, 146, 148, 150. The sensors 134, 136, 138, 140 and/or 144, 146, 148, 150 are positioned in proximity to the pathway 126 having a boundary or obstruction on one or more sides of the pathway, such as workstations 116. Whether aligned or offset, the object is likely to traverse in a linear manner if the pathway is bounded on at least one side by a boundary or obstructions, such as structure 112 or an item 116-122. For example, as illustrated by pathway 124, a person is likely to traverse the path 110 in a linear manner because the path is situated in a hallway substantially bounded on both sides by walls.

An object, such as a person, may also travel in a non-linear manner whether aligned or offset from one or more sensors. The object may traverse in the non-linear manner to, at least in part, maneuver around any structures 112 or items 116-122 in or near a particular pathway. For some embodiments, an object may travel in a non-linear manner offset from the position of one or more sensors to avoid various workstations 116 and a cubical 118. For example, the pathway 128 may represent a non-linear pathway offset from sensors 144, 146, 148, 150 and/or 154, 156, 158, 160. The sensors 144, 146, 148, 150 and/or 154, 156, 158, 160 are positioned in proximity to the pathway 128 having a boundary or obstruction on one or more sides of the pathway. For some other embodiments, an object may traverse in a non-linear manner aligned with some sensors, but offset from other sensors, to avoid an obstacle such as an appliance 122 or to move toward a target such as a portal. For example, the pathway 130 may represent a non-linear pathway detected by sensors 132, 142, 152. The sensors 170, 172, 174, 176 are positioned in proximity to the pathway 124, 126 having a boundary or obstruction on one or more sides of the pathway. Whether aligned or offset, the object is likely to traverse in a non-linear manner if the pathway is bounded on at least one side by a boundary or obstructions, such as structure 112 or an item 116-122. For example, as illustrated by pathway 130, a person is likely to traverse the area 102 in a non-linear manner to avoid the appliance 122 or head toward the portal 112.

The building management system 100 may include an energy manager 182 to communicate directly or indirectly with the sensors and received data from the sensors. The energy manager 182 may receive data associated with objects traversing through areas 102-108 and paths 110 over a period of time and analyze the data to perform sensor time correction. The energy manager 182 may take into consideration the fact that objects, particularly people, do not necessarily walk in a straight line. Thus, an analysis of the data by the energy manager 182 may be based on a mean, median, or mode of the data, and a larger sampling of data would be preferable over a smaller sampling of data. The analysis of the data by the energy manager 182 may also be filtered, such as removing or de-emphasizing extremes from consideration. The analysis of the data by the energy manager 182 may further apply weightings to the data based on location or type. For example, a hallway may motivate people to walk in a substantially straight line so data associated with a hallway may be given more significance than data associated with a more open area.

Figure 2A:
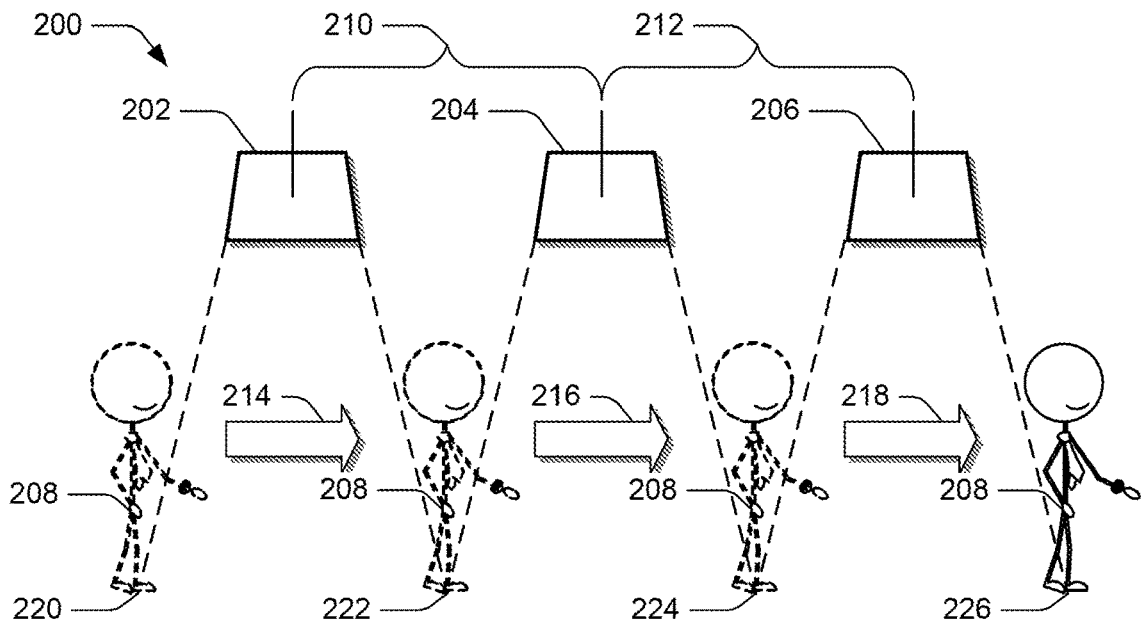
FIG. 2A is a schematic, planar view of an example pathway of a person traversing in proximity to sensors of the building management system.

FIG. 2A illustrates an example depiction 200 of sensors 202-206 of the building management system 100 as a person 208 traverses in proximity to the sensors. The sensors 202-206 may be positioned in an area 102-108 or a path 110 such that there is a particular distance 210, 212 between each pair of sensors. The distances between sensors are stored at the energy manager 182, whether they are received by the energy manager from another device, such as the sensors or a mobile device, or submitted manually by a technician to the energy manager. As shown in FIG. 2A, a first distance 210 represents the distance between a first sensor 202 and a second sensor 204, and a second distance 212 represents the distance between the second sensor and a third sensor 206. The data stored by the energy manager 182 do not necessarily need to represent distances of adjacent sensors. For example, the energy manager 182 may track the distance between the first sensor 202 and the third sensor 206 in addition to, or in the alternative to, at least one of the first and second distances 210, 212. Also, where the distances between pairs of sensors are similar, the energy manager 182 may store a single value to represent distances between pairs of sensors. Where the distances between pairs of sensors differ, such as the first distance 210 being greater than the second distance 212, the energy manager 182 may store multiple values to represent distances between pairs of sensors.

The person 208 may walk in proximity to the sensors 202-206 in certain directions 214-218 to traverse to various locations 220-226 along the pathway. For example, the first sensor 202 may detect the person 208 traversing from a first position 220 to a second position 222 in a first direction 214. Likewise, the second sensor 204 may detect movement from the second position 222 to a third position 224 in a second direction 216, and the third sensor 206 may detect movement from the third position 224 to a fourth position 226 in a third direction 218. The sensors provide time measurements in response to detecting that an object, such as the person 208, has traversed among the sensors.

Figure 2B:
FIGS. 2B through 2D are graphical views corresponding to the schematic, planar view of FIG. 2A and representing signals generated by the sensors of the building management system as the person traverses in proximity to the sensors.
Figure 2C:
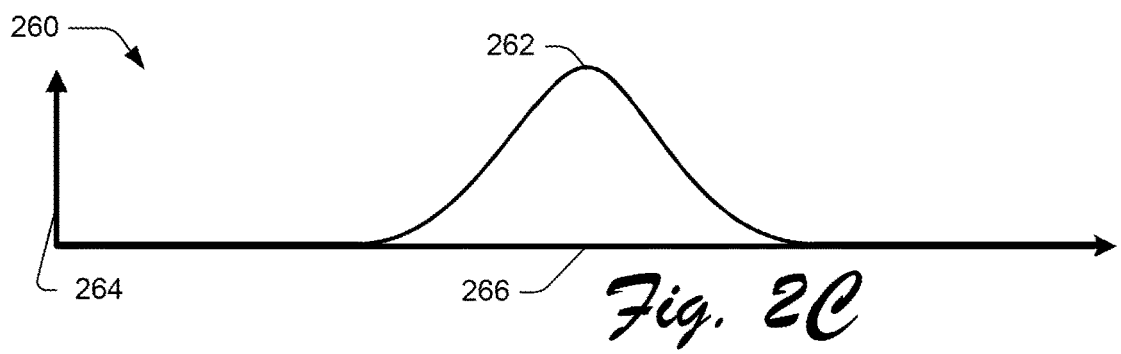
Figure 2D:
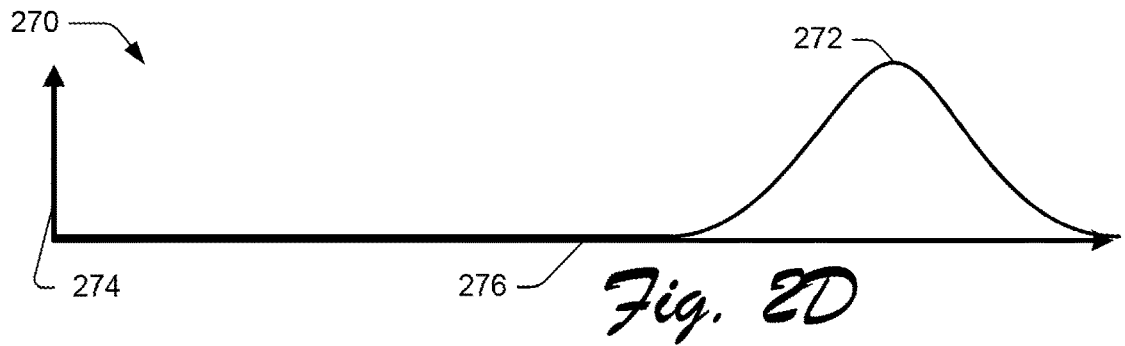

FIGS. 2B through 2D represents graphical views 250, 260, 270 of signals 252, 262, 272 generated by the sensors 202-206 as the object, such as the person 208, traverses near the sensors. FIG. 2B shows a first graph 250 representing a first signal 252 associated with the first sensor 202 in terms of signal strength 254 over time 256, FIG. 2C shows a second graph 260 representing a second signal 262 associated with the second sensor 204 in terms of signal strength 264 over time 266, and FIG. 2D shows a third graph 270 representing a third signal 272 associated with the third sensor 206 in terms of signal strength 274 over time 276. As illustrated by FIGS. 2B through 2D, in view of the example depiction 200 of FIG. 2A, the first sensor 202 generates the first signal 252 to represent information detected by the first sensor as the object traverses in proximity to the first sensor. Similar, the second and third sensors 204, 206 generate the second and third signals 262, 272 to represent information detected by the second and third sensors as the object traverses in proximity to the sensors. In an ideal situation, as shown by FIGS. 2B through 2D, the peaks of the first, second, and third signals 252, 262, 272 correspond to the timing and order of the information detected by the sensors 202-206 as well as the distances 210, 212 between the sensors.

Figure 3A:
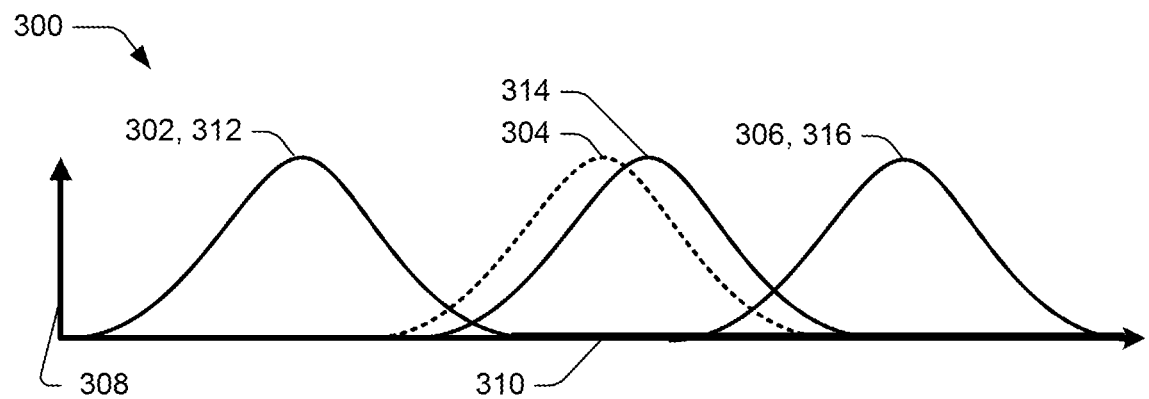
FIGS. 3A and 3B are graphical views representing example signals generated by sensors of the building management system with differing time bases.
Figure 3B:
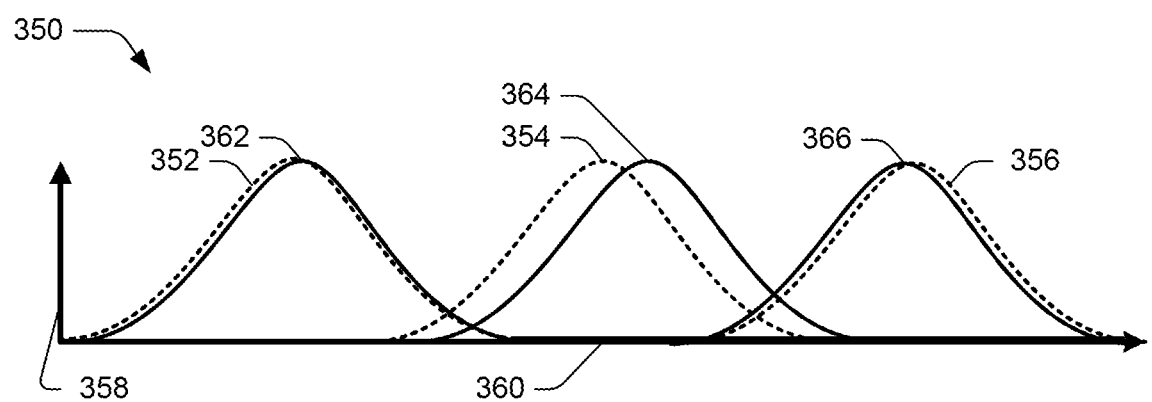

Referring to FIGS. 3A and 3B, there are shown graphical views 300, 350 of example signals 302-306, 352-356 generated by sensors of the building management system 100 with differing time bases. The signals 302-306, 352-356 are shown in a fourth graph 300 and a fifth graph 350 as dotted lines but they may not appear as dotted lines if overlapped by a solid line. The sensors providing time measurements in response to detecting one or more objects traversing among the sensors, and the time measurements are associated with unsynchronized time.

Referring specifically to FIG. 3A, the energy manager 182 of the building management system 100 determines a sensor time error for each sensor by cross-correlating time measurements received from the sensors with a predicted time. The energy manager 182 receives the signals 302-306 from the sensors 132-180 and compares the received signals to predicted signals 312-316. The dotted lines of the received signals 302 and 306 may be difficult to see in FIG. 3A due to the solid lines of the predicted signals 312, 316 that overlap the dotted lines. The energy manager 182 identifies the predicted time, associated with the predicted signals 312-316, for traversing among the sensors based on distances between sensors and an average velocity of the object to traverse among the sensors, such as an average walking speed. The distances between sensors may be stored at the energy manager 182, whether received from the sensors 132-180 or manually entered at the energy manager by a technician. The general range for leisure walking speeds is about 1.0 meters per second to 1.8 meters per second, and an average leisure walking speed is about 1.4 meters per second depending on walking conditions such as surface type, obstructions, illumination, temperature, air quality, and other environmental factors.

For cross-correlation, the energy manager 182 may determine a sensor time error of one or more time measurements relative to one or more other time measurements. For example, for the time measurements shown in FIG. 3A, the first and third received signals 302, 306 from the first and third sensors correspond substantially to the first and third predicted signals 312, 316, but the second received signal 304 is offset from the second predicted signal 314. Thus, the energy manager 182 may determine the sensor time error based on a difference between the second received signal 304 and the second predicted signal 314 in response to alignment of the first received signal 302 with the first predicted signal 312 and/or the third received signal 306 with the third predicted signals 316. In particular, the energy manager 182 may compute areas beneath the curves of the second received signal 304 and the second predicted signal 314 and determine peaks corresponding to the second received and predicted signals based on each computed area. The energy manager 182 may then determine sensor time error, or sensor time correction, based on the difference between the peaks.

For another example, in view of the time measurements shown in FIG. 3B, the first and third received signals 352, 356 from the first and third sensors correspond somewhat to the first and third predicted signals 362, 366, but the second received signal 354 is offset from the second predicted signal 364. Thus, the energy manager 182 may determine the sensor time error based on a difference between the second received signal 354 and the second predicted signal 364 in response to semi- or associated-alignment of the first received signal 352 with the first predicted signal 362 and/or the third received signal 356 with the third predicted signals 366. Again, the energy manager 182 may compute areas beneath the curves of the second received signal 354 and the second predicted signal 364, determine peaks corresponding to the second received and predicted signals based on each computed area, and determine sensor time error/correction based on the difference between the peaks.

Figure 4:
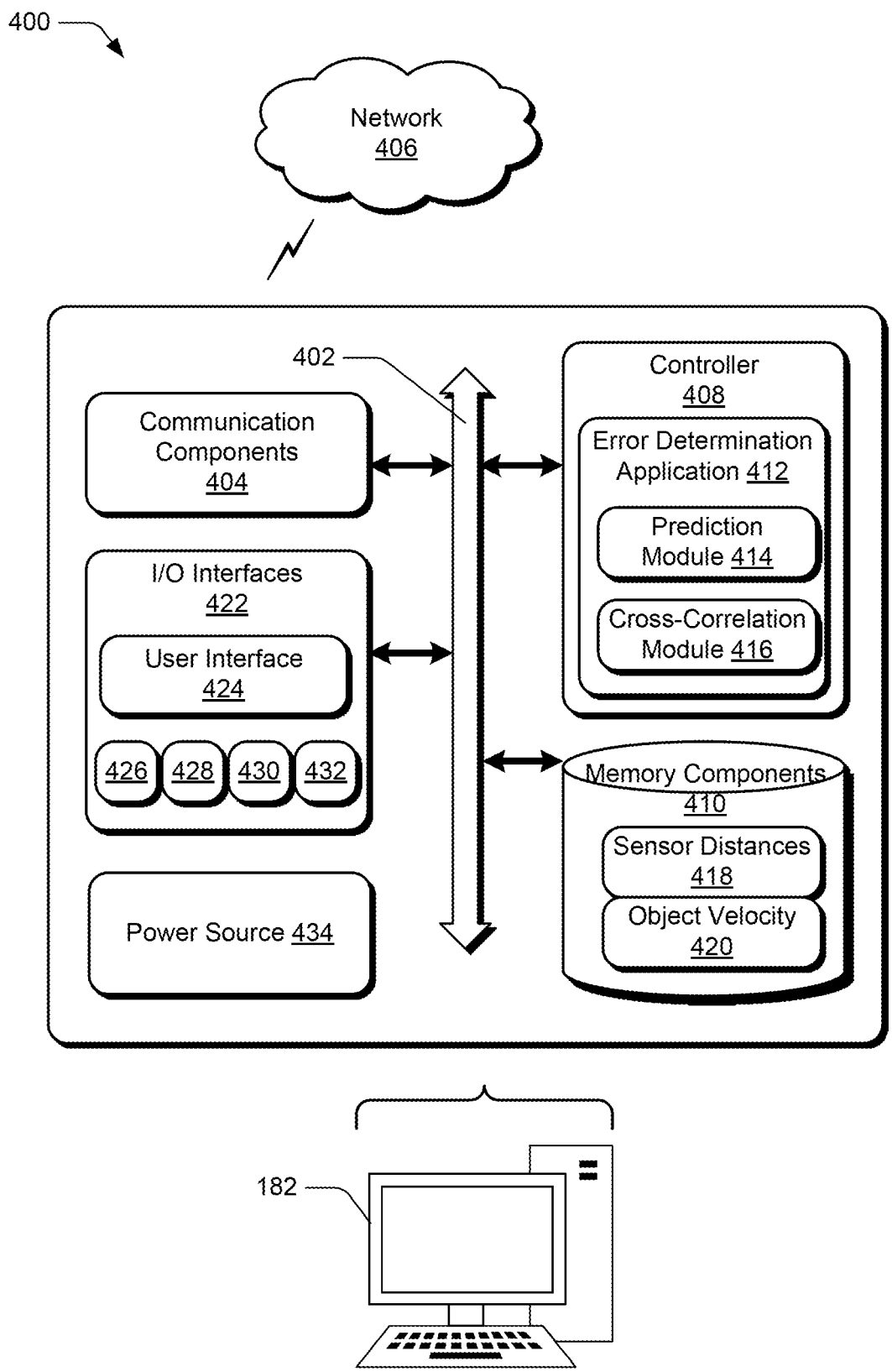
FIG. 4 is a block diagram of various components of an example energy manager of the building management system.

FIG. 4 represents the example device components 400 of the energy manager 182 of the building management system 100. The energy manager 104 may be a server, a workstation, a remote device, or other type of device for management and control of one or more aspects of the building management system 100. The device components 400 of the energy manager 104 comprise a communication bus 402 for interconnecting the other device components directly or indirectly, one or more communication components 404 communicating other entities via a wired or wireless network 406, one or more processors or controllers 408, and one or more memory components 410. The communication component 404 of the device components 400 may also utilize wired technology for communication, such as transmission of data over a physical conduit, e.g., an electrical cable or optical fiber cable. The communication component 404 may utilize, in addition to or in the alternative, wireless technology for communication, such as, but are not limited to, satellite based and cellular-based communications and their variants as well as wireless local area network (WLAN) communication and their variants, such as infrastructure, peer-to-peer, ad hoc, bridge, and wireless distribution-based communications.

The controller 408 may execute code and process data received other components of the device components 400, such as information received at the communication component 404 or stored at the memory component 410. The code associated with the building management system 100 and stored by the memory component 410 may include, but is not limited to, operating systems, applications, modules, drivers, and the like. An operating system includes executable code that controls basic functions of the energy manager 104, such as interactions among the various components of the device components 400, communication with external devices via the communication component 404, and storage and retrieval of code and data to and from the memory component 410. Each application includes executable code to provide specific functionality for the controller 408 and/or remaining components of the energy manager 104. Examples of applications executable by the controller 408 include, but are not limited to, building management applications, such as an error determination application 412 to determine the sensor time error for each sensor, a prediction module 414 to determine the predicted time for traversing among the sensors, and a cross-correlation module 416 to perform cross-correlation of time measurements with predicted time. Data is information that may be referenced and/or manipulated by an operating system or application for performing functions of the energy manager 104. Examples of data associated with the building management system 100 and stored by the memory component 410 may include, but are not limited to, sensor distances 418 identifying distances between pairs of sensors, object velocity 420 identifying the average velocity of the object to traverse among the sensors, and the like.

The device components 400 of each energy manager 104 may further comprise one or more input and/or output components (I/O interfaces) 422. The I/O interfaces 422 of the device components 400 may include a variety of video, audio, and/or mechanical components. The I/O interfaces 422 of each energy manager 182 may comprise a user interface 424 for interaction with a user, such as a technician, of the energy manager. The user interface 424 may include a combination of hardware and software to provide a user with a desired user experience. For example, the user interface 424 may include one or more input components to allow the user to enter information and one or more output components to provide information to the user. Although the user interface 424 may include all input components and all output components of the I/O interface 422, the user interface may also be directed to a specific subset of input components and/or output components. The I/O interfaces 422 may further include one or more controllers 426-432 to manage sensor data received directly or indirectly from the sensors 132-180. Examples of the sensor data managed by the controller or controllers 426-432 include, but are not limited to, lighting, motion, temperature, imaging, and air quality data associated with each sensor. For some embodiments, a controller 426 of the I/O interfaces 422 may receive data originating from a motion sensor such as a passive infrared motion detection sensor.

The device components 400 may further comprise a power source 434, such as a power supply or a portable battery, for providing power to the other device components 400 of each energy manager 182 of the building management system 100.

It is to be understood that FIG. 4 is provided for illustrative purposes only to represent examples of the device components 400 of an energy manager 182 and is not intended to be a complete diagram of the various components that may be utilized by the device. Therefore, energy manager 182 may include various other components not shown in FIG. 4, may include a combination of two or more components, or a division of a particular component into two or more separate components, and still be within the scope of the present invention.

Figure 5:
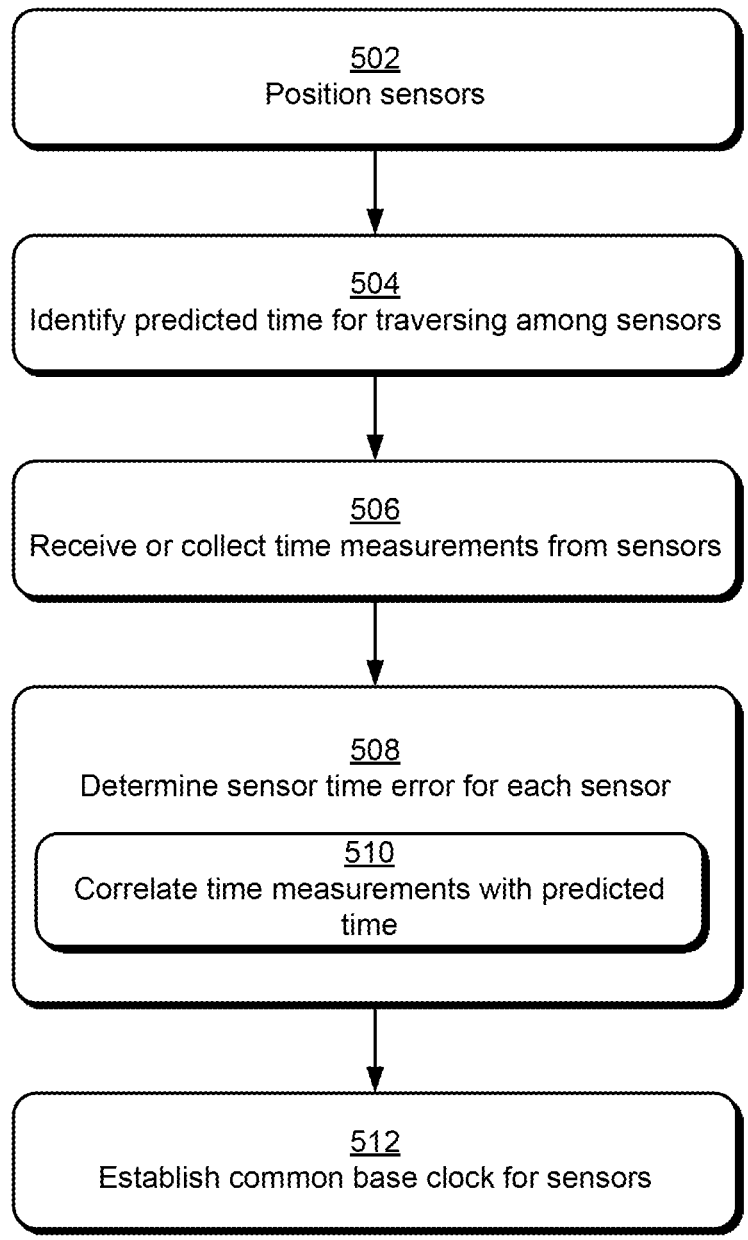
FIG. 5 is a flow diagram of an example operation of the building management system.

FIG. 5 is a flow diagram of an example operation 500 of the building management system 100. The sensors 132-180 may be positioned 502 in areas 102-108 and paths 110 of a facility managed by the building management system 100. For some embodiments, one or more of the sensors 132-180 may be motion sensors, such as passive infrared motion detection sensors. The sensors may be distributed in an even and uniform manner, distributed in a strategic non-uniform manner, or a combination thereof throughout the facility. For some embodiments, the sensors may be positioned based on the surrounding boundaries and obstructions, such as structures 112 and items 116-122. For other embodiments, the sensors may be positioned based on desired pathways in addition, or alternative, to the boundaries and obstructions. For example, the sensors may be positioned in proximity to a linear pathway having a boundary or obstruction on at least one side of the linear pathway. As another example, the sensors may be positioned in proximity to a non-linear pathway guided by a boundary or obstruction on at least one side of the non-linear pathway.

The building management system 100, such as the energy manager 182, may identify 504 a predicted time for traversing among sensors based on at least one distance between pairs of sensors and an average velocity of an object to traverse among the sensors. The distances 418 between the pairs of sensors and the velocity 420 may be stored at the memory component 410 of an energy manager 182 communicating directly or indirectly with the first and second sensors. For example, the object may be a person, the average velocity of the object may be an average walking speed of the person, and the predicted time may be determined by dividing the distance between two given sensors by an average walking speed of a person. Each pair of sensors may be adjacent sensors or non-adjacent sensors, and the average walking speed may be dependent on the environmental conditions of the sensors. Although the energy manager 182 may identify 504 the predicted time before or during positioning 502 the sensors, the energy manager may identify the predicted time after positioning the sensors when the distances between sensors are more firmly established.

The building management system 100, such as the energy manager 182, may receive or collect 506 time measurements from the sensors in response to detecting the object traversing among the sensors. The building management system 100 may receive 506 time measurements from the sensors any time after positioning 502 the sensors regardless of when the system identifies 504 the predicted time. Accordingly, the received or collect data may be subsequently processed by the system in real time or as historical data. The time measurements are associated with unsynchronized time, thus recognizing that the timing of one or more sensors may be misaligned relative to the timing of other sensors and causing the sensors to operate out-of-sync and/or out-of-order.

After identifying 504 the predicted time period and receiving/collecting 506 the time measurements, the building management system, such as the energy manager 182, may determine a sensor time error for each sensor. For example, the system 100 may determine 508 the sensor time error by cross-correlating 510 the time measurements with the predicted time. For some embodiments, the system 100 may determine a degree to which the time measurements with the predicted time are correlated based on their respective correlated peaks. In response to determining 508 the sensor time error, the building management system 100 may establish 512 a common base clock for the sensors at the energy manager 182 based on the sensor time error.

Figure 6:
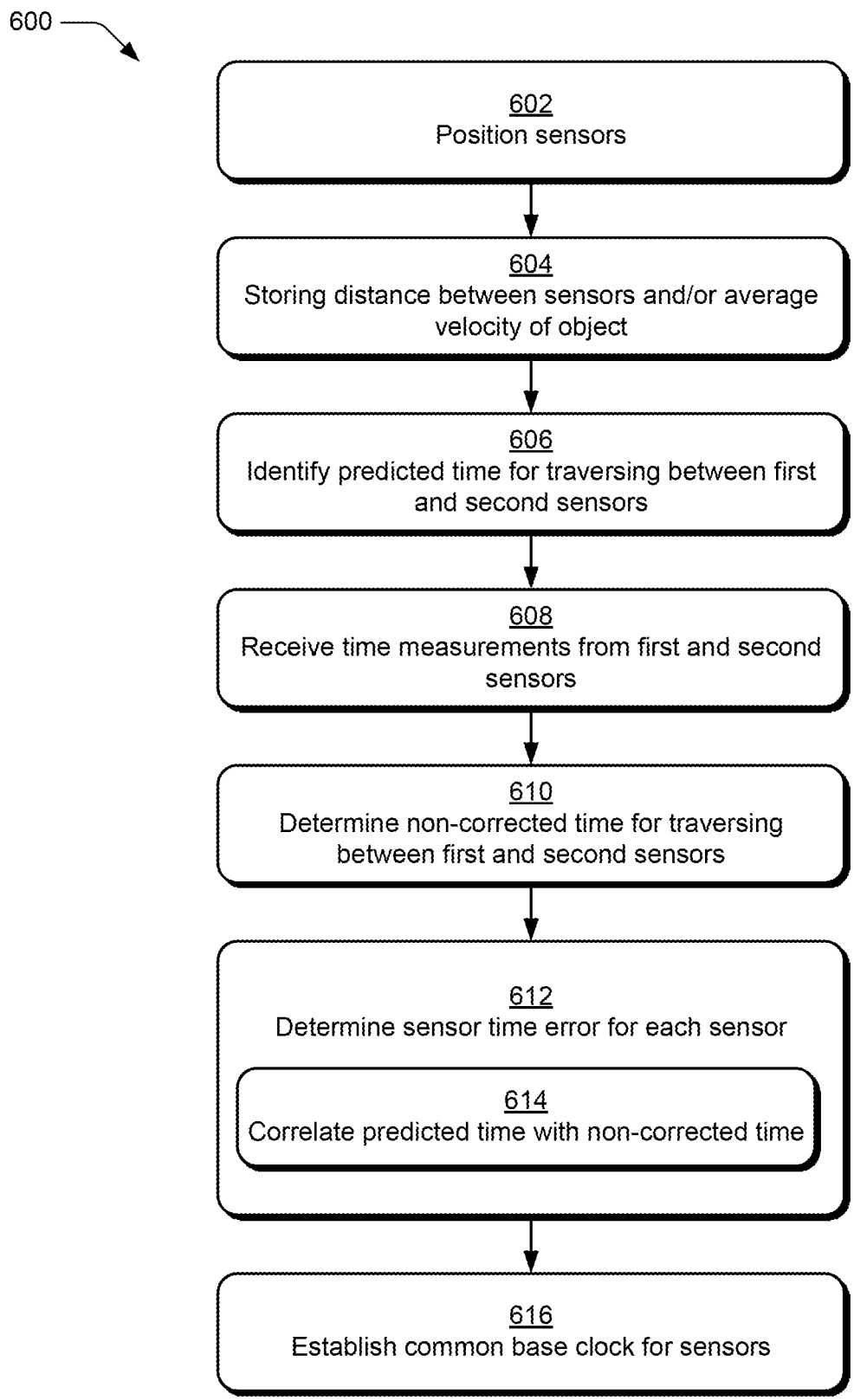
FIG. 6 is a flow diagram of another example operation of the building management system.

FIG. 6 is a flow diagram of another example operation 600 of the building management system 100. The sensors 132-180 may be positioned 602 in areas 102-108 and paths 110 of a facility managed by the building management system 100. Similar to the example operation 500 of FIG. 5, the various embodiments of the example operation 600 represented by FIG. 6 may positioned the sensors in varying ways in accordance with the present invention. For example, the first and second sensors may be positioned along a pathway guided by a boundary or obstruction on at least one side of the pathway.

The building management system 100, such as the energy manager 182, may store 604 the distance 418 between sensors, the velocity 420 of the object, or both at the memory component 410. The energy manager 182 may store 604 the distance before or during positioning 602 the sensors, but the energy manager may store this data after positioning the sensors when the distance is more firmly established.

After storing 604 the distance and velocity of the object, the building management system 100, such as the energy manager 182, may identify 606 a predicted time for traversing between a first sensor and a second sensors. The predicted time may be identified 606 based on a distance 418 between the first and second sensors and the velocity 420 of the object to traverse between the first and second sensors. For example, the object may be a person, the average velocity of the object may be an average walking speed of the person, and the predicted time may be determined by dividing the distance between the first and second sensors by an average walking speed of the person.

The building management system 100, such as the energy manager 182, may receive 608 a first time measurement from the first sensor and a second time measurement from the second sensor in response to the object traversing between the first and second sensors. The building management system 100 may receive 608 time measurements from the sensors any time after positioning 502 the sensors regardless of when the system stores 604 the distance and/or velocity or when the system identifies 606 the predicted time. Similar to the embodiments of FIG. 5, the received or collect data may be subsequently processed by the system in real time or as historical data. The time measurements are associated with a common time period but unsynchronized time, thus recognizing that the timing of one or more sensors may be misaligned relative to the timing of other sensors and causing the sensors to operate out-of-sync and/or out-of-order.

After identifying 606 the predicted time period and receiving 608 the time measurements, the building management system 100, such as the energy manager 182, may determine 610 a non-corrected time for traversing between the first sensor and the second sensor based on the first and second time measurements. The non-corrected time is based on raw data received from the sensor, such as the received signals 302-306, 352-356 shown in FIGS. 3A and 3B, so the time has not yet been corrected by the sensor time correction. Next, the building management system 100, such as the energy manager 182, may determine 612 a sensor time error for each sensor. For example, the system 100 may determine 612 the sensor time error by cross-correlating 614 the predicted time with the non-corrected time. For some embodiments, the system 100 may determine a degree to which the time measurements with the predicted time are correlated based on their respective correlated peaks. In response to determining 612 the sensor time error, the building management system 100 may establish 616 a common base clock for the first and second sensors at the energy manager 182 based on the sensor time error.

Those skilled in the art will recognize that, for simplicity and clarity, the full structure and operation of all systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of fully functional systems, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A building management system for sensor time correction comprising:
    a plurality of sensors distributed within a particular area, each pair of the plurality of sensors having a distance therebetween, the plurality of sensors providing a plurality of time measurements in response to detecting an object traversing among the plurality of sensors, the plurality of time measurements being associated with unsynchronized time, wherein the plurality of sensors are positioned in proximity to a pathway having a boundary or obstruction on at least one side of the pathway; and
    an energy manager communicating directly or indirectly with the plurality of sensors, the energy manager identifying a predicted time for traversing among the plurality of sensors based on at least one distance between pairs of sensors and an average velocity of the object to traverse among the plurality of sensors, the energy manager determining a sensor time error for each sensor of the plurality of sensors by cross-correlating the plurality of time measurements with the predicted time, wherein the energy manager determines a degree to which the plurality of time measurements with the predicted time are correlated based on their respective correlated peaks.

2. The building management system described by claim 1, wherein:
    the object is a person; and
    the average velocity of the object is an average walking speed of the person.

3. The building management system described by claim 1, wherein the at least one distance between the pairs of sensors and the average velocity of the object are stored at a memory component of the energy manager.

4. The building management system described by claim 1, wherein the energy manager establishes a common base clock for the plurality of sensors based on the sensor time error.

5. A method of a building management system for sensor time correction comprising:
    identifying a predicted time for traversing among a plurality of sensors based on at least one distance between pairs of sensors and an average velocity of an object to traverse among the plurality of sensors;
    positioning the plurality of sensors in proximity to a pathway having a boundary or obstruction on at least one side of the pathway;
    receiving a plurality of time measurements from the plurality of sensors in response to detecting the object traversing among the plurality of sensors, the plurality of time measurements being associated with unsynchronized time; and
    determining a sensor time error for each sensor of the plurality of sensors by cross-correlating the plurality of time measurements with the predicted time, wherein determining the sensor time error includes determining a degree to which the plurality of time measurements with the predicted time are correlated based on their respective correlated peaks.

6. The method described by claim 5, wherein:
    the object is a person; and
    the average velocity of the object is an average walking speed of the person.

7. The method described by claim 5, wherein:
    storing the at least one distance between the pairs of sensors at a memory component of an energy manager communicating directly or indirectly with the first and second sensors; and
    storing the average velocity of the object at the memory component of the energy manager.

8. The method described by claim 5, further comprising establishing a common base clock for the plurality of sensors, at an energy manager communicating directly or indirectly with the first and second sensors, based on the sensor time error.

9. A method of a building management system for sensor time correction comprising:
    identifying a predicted time for traversing between a first sensor and a second sensors based on a distance between the first and second sensors and an average velocity of an object to traverse between the first and second sensors;

positioning the first and second sensors along a pathway having a boundary or obstruction on at least one side of the pathway;

receiving a first time measurement from the first sensor and a second time measurement from the second sensor in response to the object traversing between the first and second sensors, wherein the first and second time measurements are associated with a common time period but unsynchronized time;

determining a non-corrected time for traversing between the first sensor and the second sensor based on the first and second time measurements; and determining a sensor time error based on a cross-correlation of the predicted time and the non-corrected time, wherein determining the sensor time error includes determining a degree to which the predicted time and the non-corrected time are correlated based on their respective correlated peaks.

10. The method described by claim 9, wherein:

the object is a person; and the average velocity of the object is an average walking speed of the person.

11. The method described by claim 9, further comprising:

storing the distance between the first and second sensors at a memory component of an energy manager communicating directly or indirectly with the first and second sensors; and storing the average velocity of the object at the memory component of the energy manager.

12. The method described by claim 9, further comprising establishing a common base clock for the first and second sensors, at an energy manager communicating directly or indirectly with the first and second sensors, based on the sensor time error.

* * * * *